April 3, 1962
R. M. GOODWIN
3,027,858
SOLDER FEEDING APPARATUS
Filed Dec. 20, 1956
4 Sheets-Sheet 1
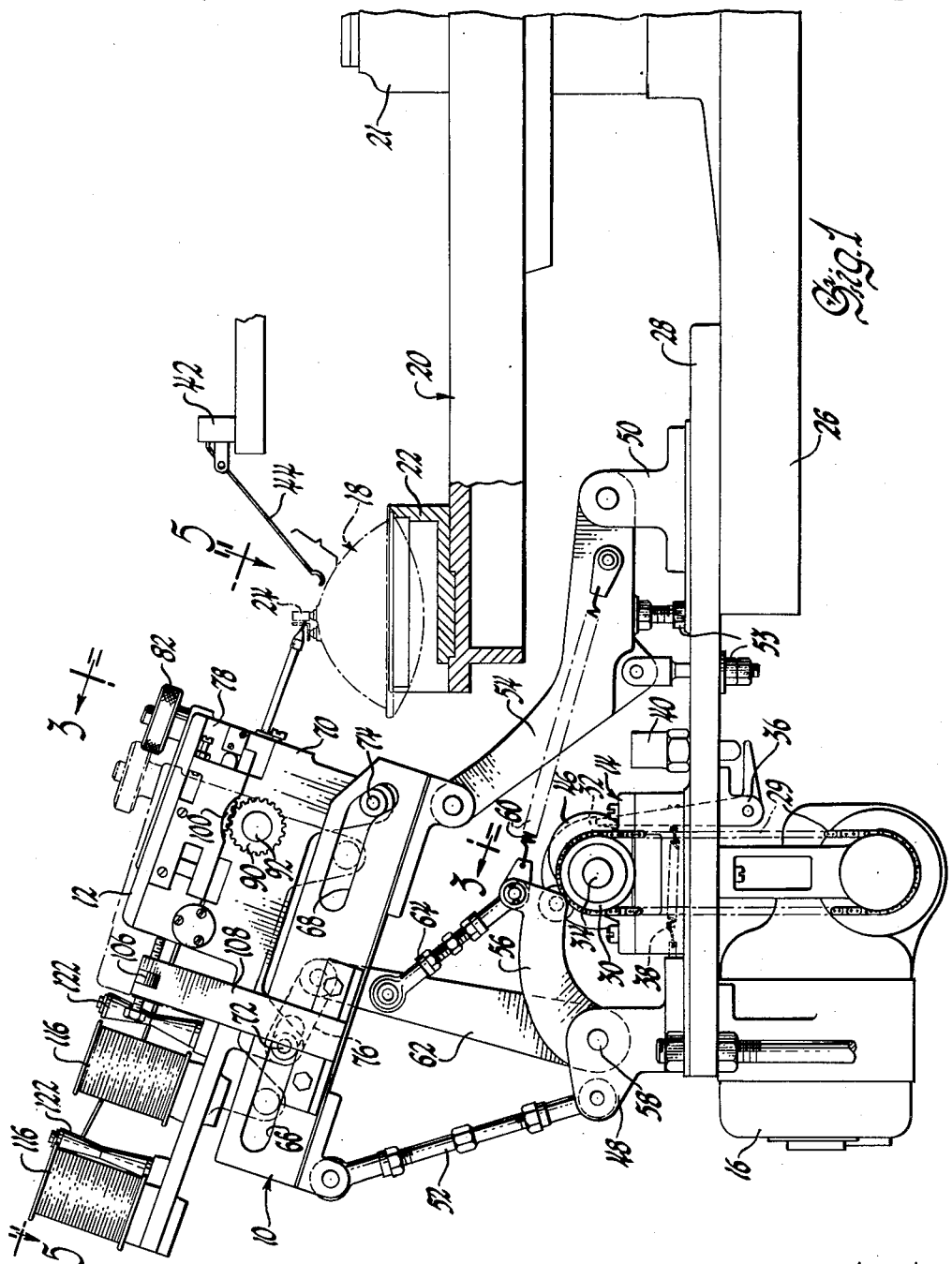
Inventor
Richard M. Goodwin
By E. W. Christen
Attorney April 3, 1962    R. M. GOODWIN    3,027,858
SOLDER FEEDING APPARATUS
Filed Dec. 20, 1956    4 Sheets-Sheet 2
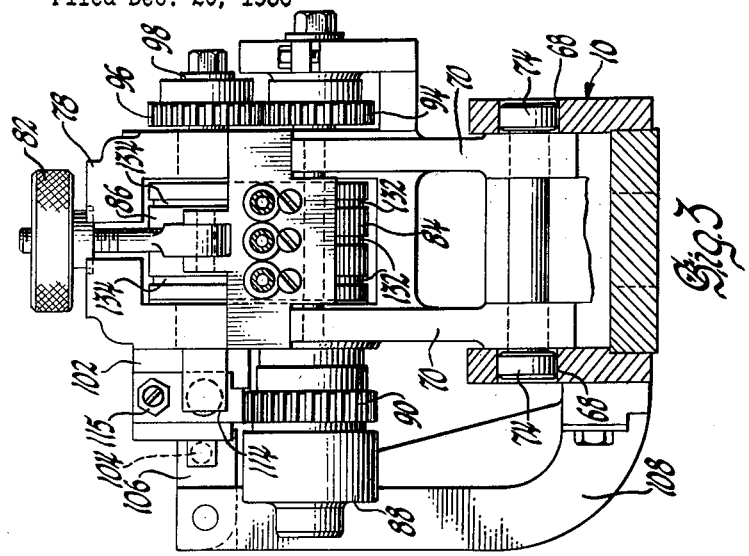
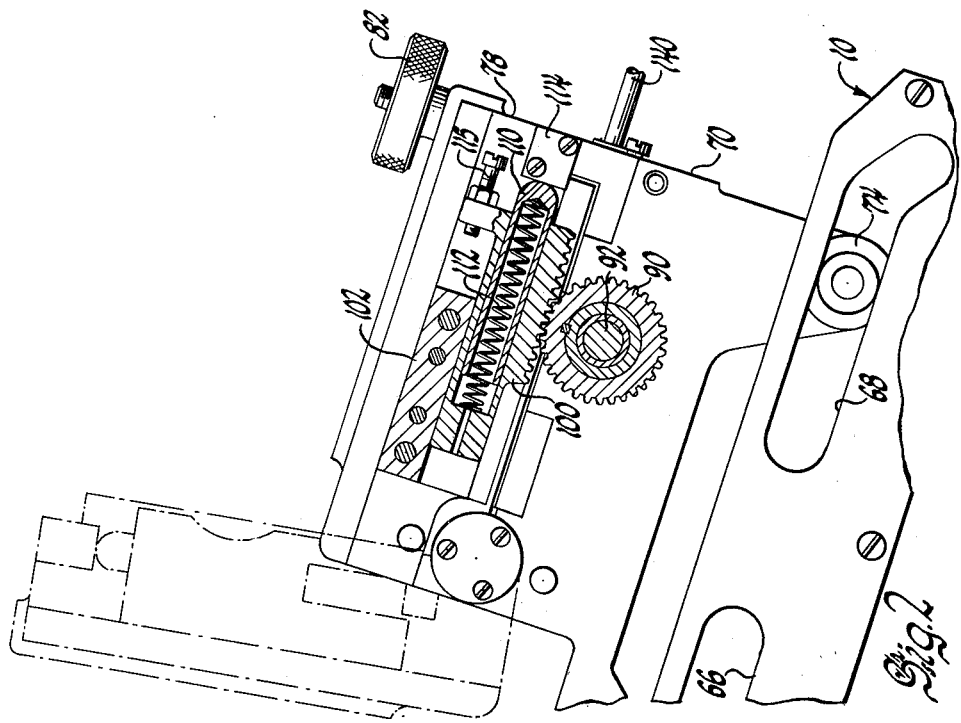
Inventor
Richard M. Goodwin
By E. W. Christen
Attorney April 3, 1962 R. M. GOODWIN 3,027,858
SOLDER FEEDING APPARATUS
Filed Dec. 20, 1956 4 Sheets-Sheet 3
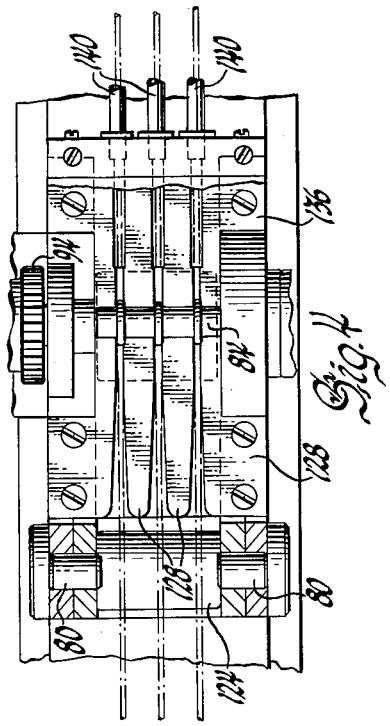
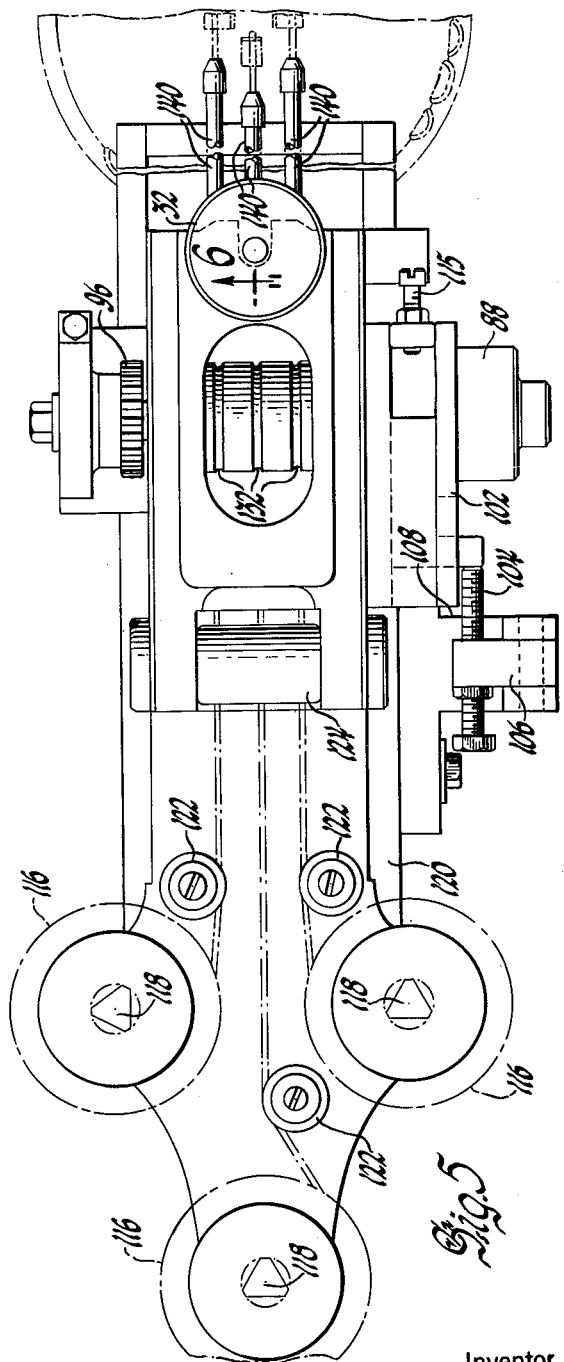
Inventor
Richard M. Goodwin
By E. W. Christen
Attorney

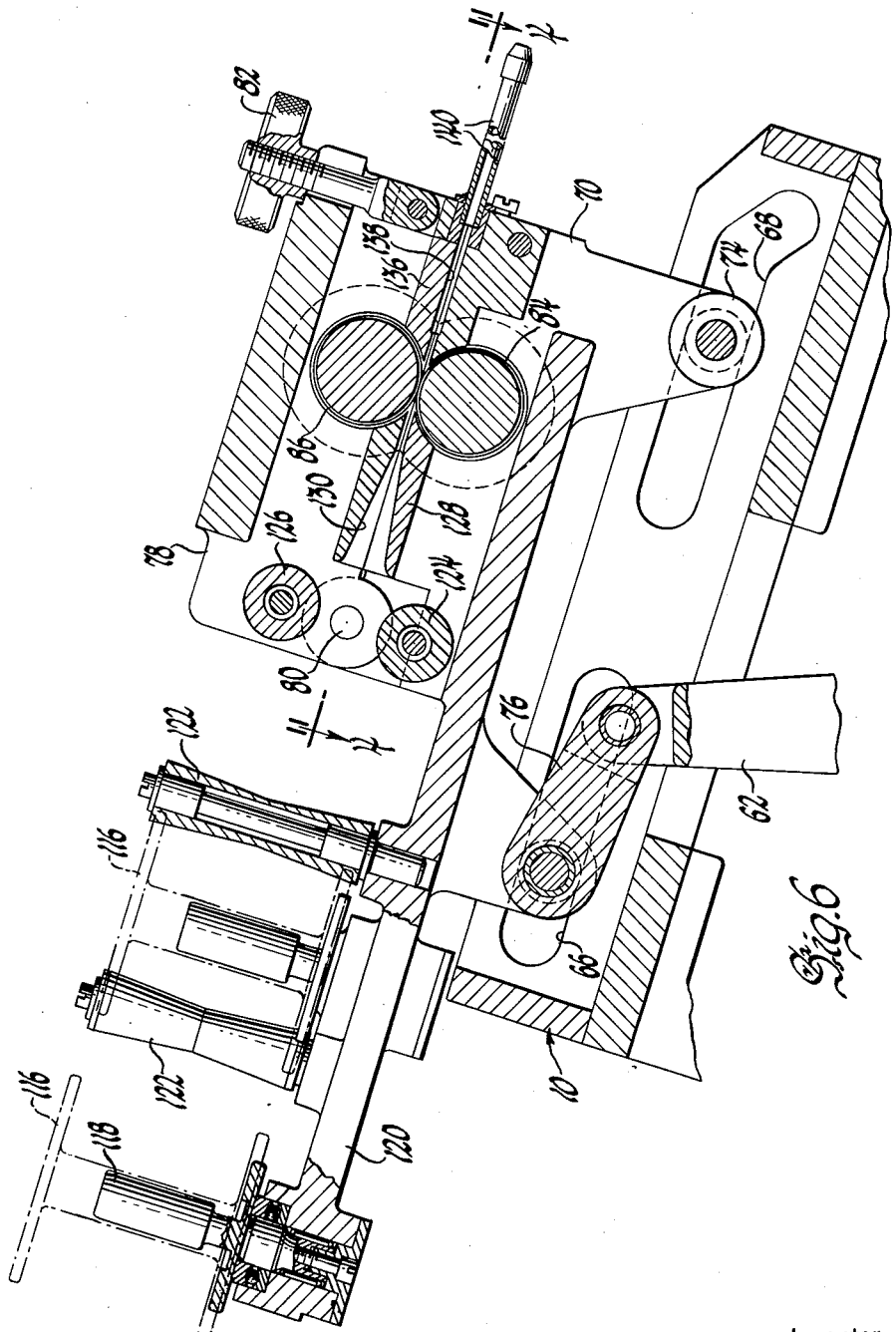

United States Patent Office 3,027,858
Patented Apr. 3, 1962

3,027,858
SOLDER FEEDING APPARATUS
Richard M. Goodwin, Anderson, Ind., assignor to General Motors Corporation, Detroit, Mich., a corporation of Delaware
Filed Dec. 20, 1956, Ser. No. 629,722
7 Claims. (Cl. 113—94)

This invention relates to solder feeding apparatus especially adapted for an automatic soldering operation in the fabrication of vehicle headlamps and similar devices.

In the manufacture of vehicle headlamps of the sealed beam type, as well as other articles manufactured by mass production techniques, automatic solder feeding is required in the interest of economy and quality of manufacture. In the basing operation of headlamp assembly, the electrtical terminals are soldered to the metal ferrules which are affixed to the lamp body. To obtain a good soldered joint it is necessary to place a predetermined quantity or incremental length of solder at the desired juncture on the workpiece. This is accomplished by apparatus which automatically and repetitively advances and positions an increment of solder for each soldering operation. Additionally, it is desired to place the solder in position by an arcuate movement to lay the solder on the workpiece. Such arcuate movement is provided by a carriage movable in an arcuate path which advances the solder by initial movement above the workpiece juncture and final movement downwardly toward the juncture.

In the fabrication of headlamps there is usually employed a conveyer apparatus of the rotatable turret type which is provided with a plurality of support heads upon which are located the workpieces to be assembled. The turret is advanced intermittently to index the support heads successively into different work stations. It is desired to perform the soldering operation, at such a work station, at a high rate of speed consistent with that of the operations performed at the other work stations. Accordingly, an intermittent drive for the soldering apparatus is actuated in timed sequence with the turret to advance and retract the carriage in its support track. The carriage is provided with feed rollers which are rotated during one direction of movement of the carriage and which are stationary during the other movement of the carriage. The feed rollers are driven by a rack gear fixed relative to the support track and which is engaged by a drive gear movable with the carriage and connected with the rollers through a one-way clutch. The placement of the solder increment on the workpieces by an arcuate movement thereof is achieved by utilizing arcuate guide ways in the support track for the carriage. In order to permit the use of a straight rack gear with this arrangement, the rack gear is slidably disposed for axial movement relative to the carriage and means are provided for retaining the rack gear fixed in an axial direction relative to the support track while permitting angular movement of the rack gear about one of its ends. A more complete understanding of the invention may be had from the detailed description which follows taken with the accompanying drawings in which:

FIGURE 1 is a side view of the inventive apparatus;
FIGURE 2 is a side view partially in section of the carriage;
FIGURE 3 is a sectional view taken on lines 3—3 of FIGURE 1;
FIGURE 4 is a sectional view taken on lines 4—4 of FIGURE 6;
FIGURE 5 is a plan view of the apparatus;
FIGURE 6 is a sectional view taken on lines 6—6 of FIGURE 5.

Referring now to the drawings, there is shown an illustrative embodiment of the invention in a solder feeding apparatus especially adapted for the soldering of electrical terminals on vehicle headlamps. In general, the apparatus comprises a support track 10 upon which is disposed the solder feeding carriage 12 adapted to be alternately advanced and retracted by an intermittent drive mechanism 14. The solder feeding carriage 12, during its advancing movement, is adapted to lay an incremental length of solder upon the joint to be soldered on the lamp 18.

As shown in FIGURE 1, a rotatable turret or table 20, mounted upon a central vertical shaft within the housing 21, supports adjacent its periphery a plurality of support heads 22, one of which is shown in the drawings. The lamp 18 is disposed in inverted position in the support head 22 so that the base or terminal structure 24 of the lamp is uppermost. The terminal structure 24 includes a plurality of metal ferrules, usually three in number, upon each of which is disposed a metal terminal of L-shaped configuration. The terminal is provided with an aperture in one leg thereof which is fitted over the extremity of the ferrule for facilitating the soldering operation. It is necessary to place the solder on each ferrule at the juncture thereof with the terminal.

The solder feeding apparatus is disposed at the soldering station adjacent the periphery of the rotatable table 20 and is mounted upon a fixed support table 26 by a mounting plate 28. The intermittent drive mechanism 14 is mounted upon the plate 28 and comprises a continuously running motor and suitable reduction gear 16 having a drive sprocket connected by a chain 29 to a driven sprocket 30. The driven sprocket is coupled to a one-revolution clutch 32 and both are mounted coaxially with the driven shaft 34 to which the clutch is operatively coupled. The clutch includes a bell crank pawl 36 pivotally mounted on the plate 28 and having one arm disposed in alignment with the radial shoulder of the clutch. A spring 38 has one of its end grounded to the mounting plate 28 while its other end is connected to the arm of the bell crank pawl 36 to yieldably urge the latter into engagement with the radial shoulder of the clutch 32. The other arm of the bell crank pawl 36 is disposed in alignment with the piston of a pneumatic actuator 40. The actuator 40 may be energized from a source of air pressure, not shown, under the control of an electrical switch 42. The switch 42 is suitably positioned on a fixed portion of the machine and has an actuating arm 44 which extends into the path of the headlamp 18 in the support head 22 as it is indexed by the table 20 into the soldering station. Actuation of the switch 42 is indicative of the presence of a headlamp in the support head and is effective through a suitable valve (not shown) to momentarily energize the actuator 40. Energization of the actuator causes displacement of the pawl 36 to permit the shaft 34 to be driven through one revolution. A drive cam 46 is secured to the shaft 34 for rotation therewith and is of a single lobe configuration for imparting movement to the carriage 12 through a linkage arrangement to be described presently.

The support track 10 and carriage 12, movable thereon, are desirably adapted to permit directional control of the carriage motion to obtain proper alignment with the ferrules of the terminal structure 24. The support track 10 is adjustably mounted upon the plate 28 by a rear fixed bracket 48 through pivotal link 52 and a front fixed bracket 50 through pivot link 54. The pivotal link 52 is extensible by screw thread adjustment to permit elevation of the rear end of support track 10. The link 54 is provided with stop bolts 53 which coact with opposite sides of the plate 28 for elevation adjustment of the front end of support track 10. A follower arm 56 is pivotally mounted on the support bracket 48 by a shaft 58 and is provided with a follower roller at its free end in engagement with the drive cam 46. A tension spring 60 is connected between the follower arm 56 and the pivotal link 54 to maintain engagement of the follower roller and drive cam during rotation of the latter. Thus, rotation of the drive cam 46 causes oscillatory motion to be imparted to the follower arm 56 which is transmitted to a drive lever 62 through an adjustable link 64. The drive lever 62 is freely rotatable on the shaft 58 and is caused to oscillate through one cycle of motion in the fore and aft directions by a single revolution of the drive cam 46. The drive lever 62 is connected at its upper end with the lower portion of carriage 12 in a manner to be described presently.

The support track 10 is generally of channel shape configuration and includes on both sides a rear guide surface or way 66 and a front guide surface or way 68. The rear guide ways 66 are substantially straight and the front guide ways 68 have a straight rear portion and an arcuate or downwardly inclined front portion. The carriage 12 is provided at the lower portion 70 of its frame with a pair of rear rollers 72 disposed within the guide ways 66 and a pair of front rollers 74 disposed within the guide ways 68. To alternately advance and retract the carriage 12 upon its rollers in the guide ways, the drive lever 62 is connected by a link 76 to the shaft of the rear rollers 72.

The carriage 12, as shown in FIGURE 6, includes an upper section 78 which is hinged by pivot pins 80 so that it may be swung upwardly upon release of the clamp nut assembly 82, as shown in the phantom lines of FIGURE 2, to permit inspection and servicing of the mechanism. The carriage 12 supports a pair of feed rollers 84 and 86 which are journalled in the lower and upper sections 70 and 78, respectively. The drive train for the rollers, as shown in FIGURES 2 and 3, comprises a one-way clutch 88 having its driving element secured to the gear 90 for rotation therewith and its driven element non-rotatably secured to the shaft 92 upon which is mounted the lower feed roller 84. At the opposite end of the shaft 92 the gear 94, non-rotatably secured thereto, meshes with the gear 96 which is non-rotatably secured to the shaft 98 upon which the upper feed roller 86 is mounted.

Rotation is imparted to the gear 90 by a rack gear 100 which is slidably disposed in a bracket 102 secured to a lateral surface of the upper section 78 of the carriage. The rack gear 100 has its rearmost end in abutment with an adjustable stop bolt 104 which is disposed in threaded engagement with a link 106 which in turn is pivotally mounted upon a fixed bracket 108 secured to the support track 10. The rack gear 100 is provided with an axial bore within which is slidably disposed a plunger 110 which is urged outwardly thereof by a compression spring 112. The forward end of the plunger 110 is seated against a fixed stop 114 rigidly secured to the upper section 78 of the carriage. The spring 112 and plunger 110 coact with the stop 114 to maintain the rack gear 110 in abutment at its rearmost end with the adjusting bolt 104. An adjustable stop bolt 115 is secured to the rack gear 100 in alignment with the forward end of bracket 102 to cause concurrent translation of rack gear 100 and gear 90 during the last portion of the advancing movement of carriage 12. This stop bolt 115 is thus adapted to adjust the amount of rotation imparted to the gear 90 by the rack gear 100 during the advancing and retracting movements of the carriage 12.

Solder, in the form of wire, is supplied to the feed rollers 84 and 86 from supply spools 116 which are mounted upon respective spool shafts 118 rotatably journalled on the carriage platform 120. The solder is guided from each supply spool 116 by a corresponding guide roller 122 and thence between a pair of idler rollers 124 and 126. At the entrance to the feed rollers 84 and 86 there is disposed a rear guide section 128 which defines a flared solder passage 130 corresponding to each supply spool.

Each solder passage 130 is aligned with circumferential grooves 132 and 134 in the lower and upper feed rollers respectively. A front guide section 136 defines guide passages 138 which terminate in guide tubes 140. The guide sections 128 and 136 are both suitably constructed with upper and lower parts which are secured to the upper section 78 and the lower section 70 of the carriage respectively. The guide tubes 140 are secured to the lower portion 70 of the carriage. It is noted that the guide tubes 140 are disposed in staggered relation at their outer ends to correspond to the pattern of the plural solder connections to be made upon the workpiece.

In operation it may be assumed that the solder wires from the respective spools 116 have been positioned in the solder passages 130 and 138 between the feed rollers 84 and 86 to project beyond the ends of the guide tubes 140. The carriage 12 is normally located in its retracted position. The motor and reduction gear 16 are continuously running and the rotary turret 20 is intermittently advanced to index successive support heads into the soldering station. When the support head 22, carrying headlamp 18, is indexed into the soldering station, the presence of the headlamp is detected by the electrical switch 42 and the actuator 40 is energized. Consequently, the pawl 36 is displaced momentarily to permit the shaft 34 to rotate through one complete revolution. Accordingly, the drive cam 46 causes the follower arm 56 and drive lever 62 to oscillate through one cycle and to impart advancing and retracting movement to the carriage 12. As the carriage moves forward on the support track 10, the initial movement thereof is substantially rectilinear by virtue of the straight portions of the guide ways 66 and 68 while the final portion of the movement is a rocking or arcuate downward motion of the front end of the carriage by virtue of the arcuate portion of the guide ways 68. During this advancing movement of the carriage the rack gear 100 is maintained in engagement with the stop bolt 104 by the plunger 110 and spring 112 and thus the rack gear remains fixed relative to the support track 10. As a result, the gear 90 is rotatably driven by the forward movement of the carriage in the non-driving direction of the one-way clutch 88. Accordingly, the rotation of the gear 90 is not imparted to the feed rollers 84 and 86 and the solder wire therebetween is held in position. During the final portion of the advancing movement of the carriage the projecting ends of the solder wires are laid upon the joints to be soldered on the terminal structure 24. A short dwell interval with the carriage in this advanced position may be provided by the configuration of drive cam 46 during which heat is applied by suitable means, not shown, for completing the soldering operation of the terminal structure 24. Upon completion of rotation of the drive cam 46 the carriage 12 is retracted by initial upward arcuate movement and final straight line movement. During this retraction the gear 90 is moved relative to the rack gear 100 causing rotation thereof in the drive transmitting direction of the one-way clutch 88. Accordingly, this motion is imparted to the feed rollers 84 and 86 and the solder wire therebetween is advanced an increment corresponding to the extent of rotation in preparation for the succeeding cycle.

Although the description of this invention has been given with respect to a particular embodiment it is not to be construed in a limiting sense. Many variations and modifications within the spirit and scope of the invention will now occur to those skilled in the art. For a definition of the invention, reference is made to the appended claims.

What is claimed is:

1. Apparatus for advancing successive predetermined increments of wire from a supply source comprising a support track, a carriage mounted on said track, actuating means connected with the carriage for alternate advancing and retracting movement of the carriage on the track, a feed roller having a shaft rotatably mounted on the carriage and adapted to advance a predetermined increment of wire when rotated, a wire supply source adapted to supply wire to said feed roller, a rack gear mounted on said carriage for relative movement therebetween and supported in fixed relation to said track, a driven gear engaging said rack gear, and a one-way clutch interposed between said driven gear and said shaft for rotating said feed roller on alternate motions of said carriage.

2. Apparatus for advancing successive predetermined increments of wire and positioning each increment on a workpiece comprising a carriage movably mounted on arcuate ways of a support track, actuating means connected with the carriage for alternate advancing and retracting movement of the carriage on the track, a feed roller having a transverse shaft rotatably mounted on the carriage and adapted to advance a predetermined increment of wire when rotated, a driven gear connected with said shaft through a one-way clutch, a rack gear engaging said driven gear and slidably mounted on said carriage to permit relative movement of the carriage in a direction axially of said rack gear, and means for preventing relative axial movement of said rack gear and said track whereby said feed roller is rotated on alternate movements of said carriage.

3. Apparatus for advancing successive predetermined increments of wire and positioning each increment on a workpiece comprising a carriage movably mounted on arcuate ways of a support track, actuating means connected with the carriage for alternate advancing and retracting movement of the carriage on the track, a feed roller having a transverse shaft rotatably mounted on the carriage and adapted to advance a predetermined increment of wire when rotated, a driven gear connected with said shaft through a one-way clutch, a rack gear engaging said driven gear and slidably mounted on said carriage to permit relative movement on the carriage in a direction axially of said rack gear, stop means on said track engaging said rack gear to prevent relative axial motion thereon in one direction, a spring urged plunger interposed between said rack gear and said carriage for urging said rack gear in said direction whereby said driven gear is rotated by the rack gear upon movement of the carriage and said feed roller is rotated on alternate movements of said carriage.

4. Apparatus for advancing successive predetermined increments of wire and positioning each increment on a workpiece comprising a carriage movably mounted on arcuate ways of a support track, actuating means connected with the carriage for alternate advancing and retracting movement of the carriage on the track, a feed roller having a transverse shaft rotatably mounted on the carriage and adapted to advance a predetermined increment of wire when rotated, a driven gear connected with said shaft through a one-way clutch, a rack gear engaging said driven gear and slidably mounted on said carriage to permit relative movement of the carriage in a direction axially of said rack gear, stop means on said track engaging said rack gear to prevent relative axial motion thereof in one direction, a spring urged plunger interposed between said rack gear and said carriage for urging said rack gear in said direction, adjustable stop means on said rack gear aligned with a portion of said carriage to cause concurrent motion thereof after a predetermined relative movement, whereby the driven gear is rotated a predetermined amount by the movement of said carriage and the feed roller is rotated a predetermined amount on alternate movements of said carriage.

5. Solder feeding apparatus for advancing successive predetermined increments of solder wire and positioning each increment on a workpiece comprising a mounting member, a support track dirigibly mounted on said member and including arcuate ways, a carriage movably mounted on said ways, actuating means connected with said carriage for alternate advancing and retracting movement of the carriage on the track, a first feed roller having a transverse shaft rotatably mounted on the carriage and adapted to advance a predetermined increment of wire when rotated, a driven gear connected with said shaft through a one-way clutch, a second feed roller disposed adjacent the first feed roller, gear means interconnecting said rollers for opposite directions of rotation, a rack gear engaging said driven gear and slidably mounted on said carriage to permit relative movement of the carriage in a direction axially of said rack gear, and means for preventing relative axial movement of said rack gear and said track whereby said feed rollers are rotated on alternate movements of said carriage.

6. In combination, a conveyer, a support head on said conveyer adapted to support a headlamp, solder wire feeding apapratus disposed adjacent said conveyer and including a movable carriage, actuating means connected with said carriage for alternate advancing and retracting movement of the carriage relative to said conveyer, said actuating means including a continuously running motor, a drive cam, a one-revolution clutch interposed between the motor and the drive cam and including a stop pawl to prevent rotation of the drive cam, an oscillatable follower interconnecting the drive cam and the carriage, and control means disposed adjacent the path of said support head and adapted when engaged by a headlamp therein to cause displacement of said stop pawl.

7. In combination, a conveyer, a support head on said conveyor adapted to support a headlamp, solder wire feeding apparatus disposed adjacent said conveyer and including a support track, a carriage mounted on said track, actuating means connected with the carriage for alternate advancing and retracting movement of the carriage on the track, a feed roller having a shaft rotatably mounted on the carriage and adapted to advance a predetermined increment of wire when rotated, a wire supply source adapted to supply wire to said feed roller, a rack gear supported in fixed relation to said track, a driven gear engaging said rack gear, and a one-way clutch interposed between said driven gear and said shaft for rotating said feed roller on alternate motions of said carriage, said actuating means including a continuously running motor, a drive cam, a one-revolution clutch interposed between the motor and the drive cam and including a stop pawl to prevent rotation of the drive cam, an oscillatable follower interconnecting the drive cam and the carriage, and control means disposed adjacent the path of said support head and adapted when engaged by a headlamp therein to cause displacement of said stop pawl.

References Cited in the file of this patent

UNITED STATES PATENTS

| | | |
|---|---|---|
| 1,708,756 | Fagan et al. | Apr. 9, 1929 |
| 1,938,387 | Irwine | Dec. 5, 1933 |
| 2,082,080 | Palucki | June 1, 1937 |
| 2,228,291 | Weston | Jan. 14, 1941 |
| 2,604,064 | Sefton | July 22, 1952 |
| 2,685,268 | Yeo et al. | Aug. 3, 1954 |
| 2,767,675 | McGowan | Oct. 23, 1956 |
| 2,808,636 | Vargo et al. | Oct. 8, 1957 |